United States Patent [19]

Uchida

[11] Patent Number: 5,138,632
[45] Date of Patent: Aug. 11, 1992

[54] CORRELATION PULSE GENERATING CIRCUIT

[75] Inventor: Yoshitaka Uchida, Tokyo, Japan

[73] Assignee: Clarion Co., Ltd., Tokyo, Japan

[21] Appl. No.: 619,306

[22] Filed: Nov. 28, 1990

[30] Foreign Application Priority Data

Dec. 1, 1989 [JP] Japan .................................. 1-313811

[51] Int. Cl.$^5$ .......................... H04K 1/04; H04L 9/00
[52] U.S. Cl. ........................................ 375/1; 375/96; 375/102
[58] Field of Search ............................ 375/1, 96, 102

[56] References Cited

U.S. PATENT DOCUMENTS

| | | | |
|---|---|---|---|
| 4,884,284 | 11/1989 | Nakayama | 375/1 |
| 4,943,974 | 7/1990 | Motamedi | 375/1 |
| 4,943,977 | 7/1990 | Uchida et al. | 375/1 |

Primary Examiner—Stephen C. Buczinski
Attorney, Agent, or Firm—Flynn, Thiel, Boutell & Tanis

[57] ABSTRACT

A correlation pulse generating circuit uses a delay circuit for delaying an output of an absolute value detecting circuit corresponding to an A/D-converted output of a correlation spike, so that amplitude information of a current correlation spike can be used for detection of the correlation spike.

5 Claims, 4 Drawing Sheets

CORRELATION PULSE GENERATING CIRCUIT

FIELD OF THE INVENTION

This invention relates to an improved correlation pulse generating circuit used in a spread spectrum receiver.

BACKGROUND OF THE INVENTION

In a spread spectrum receiver, when obtaining a correlation pulse from a correlation spike obtained by correlating a received signal with a reference signal in a correlator to use the correlation pulse for data demodulation, it is essential that an appropriate threshold signal can be set, following to any variation in the correlation spike level of the correlation output signal, depending on the received signal condition and that a target correlation output signal can be detected.

In this respect, the present inventor has proposed a correlation pulse generating circuit in a spread spectrum receiver disclosed in U.S. Pat. No. 4,943,977.

FIG. 2 is a block diagram which shows the said prior correlation pulse generating circuit used in a spread spectrum receiver. In the drawing, reference numeral 1 is a correlator and PDI (Post Detection Integration: integrating circuit); 2 is an A/D converting circuit; 3 is an inverting circuit; 4 is a selecting circuit; 5 is a peak hold circuit; 6 is a latch circuit; 7 is a threshold value setting circuit; 8 is a comparing circuit; 9 is a peak value detecting circuit consisting of the peak hold circuit 5 and the latch circuit 6; and 10 is an absolute value detecting circuit consisting of the inverting circuit 3 and the selecting circuit 4.

FIG. 3 is a timing chart showing signals in various parts in the circuit indicated in FIG. 2.

A correlation spike a coming from the correlator 1 is A/D-converted on the basis of a sampling signal b in the A/D converting circuit 2 to obtain an output c. Here the correlation spike a is A/D-converted by the rising edge of the sampling signal b for every period thereof.

Now, if it is supposed that the output code of the output c of the A/D converting circuit 2 consists of N bits and it is in a linear relation with respect to the input of the A/D converting circuit 2, the output c of the A/D converting circuit 2 is in a region comprised between $$1, 0, \ldots 0, 0 \text{ and } 1, 1, \ldots 1$$
$$\text{MSB} \quad \text{LSB} \quad \text{MSB} \quad \text{LSB}$$

(MSB and LSB representing the most significant bit and the least significant bit, respectively) in the case where the correlation spike a has the negative polarity, and between $$0, 1, \ldots 1, 1 \text{ and } 0, 0, \ldots 0, 0,$$
$$\text{MSB} \quad \text{LSB} \quad \text{MSB} \quad \text{LSB}$$

in the case where it has the negative polarity. For noise the output c has values at the neighborhood of $$1, 0, \ldots 0, 0.$$
$$\text{MSB} \quad \text{LSB}$$

That is, in the case where it has the positive polarity, the most significant bit is always "1" and the remaining bits are in a region from all "0" to all "1" for the maximum value. On the contrary, in the case where it has the negative polarity, the most significant bit is always "0" and the remaining bits are in a region from all "1" to all "0" for the minimum value.

Consequently, if the polarity of the output c of the A/D converting circuit is inversed, the negative polarity is equivalent to the positive polarity (converses being always true). The output c of the A/D converting circuit 2 is directly inputted in the selecting circuit 4 and in addition the output d of the inverting circuit 3, which is a signal obtained by inverting the polarity of the output c of the A/D converting circuit 2 by means of the inverting circuit 3, is also inputted therein. In FIG. 2, values of the output c after the A/D conversion of the correlation spikes a having the positive polarity and the negative polarity correspond to + and −, respectively. Consequently, the output d of the inverting circuit 3 corresponds to a transformation of +→− and −→+.

Utilizing the property that a positive correlation spike and a negative correlation spike occur never simultaneously, using the most significant bit f of the output c of the A/D converting circuit 2 as a trigger, the selecting circuit 4 works so that it makes the output c of the A/D converting circuit 2 pass through, in the case where the most significant bit f is "1" (i.e. the positive correlation spike is dealt with), and the output d of the inverting circuit 3 pass through, in the case where the most significant bit f is "0" (i.e. the negative correlation spike is dealt with).

In a period where neither positive nor negative polarity correlation spike exists, the selecting circuit 4 makes either one pass through, depending on the distribution of noise (state of the most significant bit f). In FIG. 3, the periods where there is no sign (+, −, 1 or 0) are those described above.

As described above, the selecting circuit 4 selects either one of the two inputs, depending on the most significant bit f of the output c of the A/D converting circuit 2, which represents the operation to detect the absolute value of the correlation spike.

Then the maximum value of the output e of the selecting circuits 4 is detected and held by the peak hold circuit 5. In this way, it is possible to obtain the maximum of the absolute value of both the positive and the negative polarity correlation spike, regardless of the polarity, positive or negative.

Furthermore, the maximum value obtained by the peak hold circuit 5 is latched by the latch circuit 6 by using a clear signal g as a trigger and at the same time the content h stored in the peak hold circuit 5 is cleared. At this time, the pulse period of the clear signal g is equal to one period of the correlation spike. That is, the peak hold circuit 5 clears the content h stored therein by the clear signal g for every period of the correlation spike and begins to hold the peak for a new period of the correlation spike.

Therefore, if the peak hold circuit has this circuit construction, it is possible to detect surely the maximum value for every period of the correlation spike. Further the maximum value latched by the latch circuit 6 is similarly renewed for every period of the correlation spike.

By adopting such a construction it is possible to follow the level variations, even if they take place in one period of the output of the correlator and it is possible also to remove erroneous operations, in the case where the polarity of the correlation spike is varied.

Then the output i of the latch circuit 6 is inputted in the threshold value setting circuit 7. The threshold value setting circuit 7 effects operation on a control signal l representing a multiplication coefficient with the data of the output i and generates a threshold value signal j. This threshold value signal j is a digital signal of N bits. Further the threshold value setting circuit 7 can set an arbitrary threshold value signal and the control signal l is generated e.g. by a CPU, etc.

Next the threshold value signal j obtained by the threshold setting circuit 7 is inputted in the comparing circuit 8.

The comparing circuit 8 compares the output e selected by the selecting circuit 4 from the group consisting of the output c of the A/D converting circuit 2 and the output d of the inverting circuit, which is obtained by inverting the polarity of the output c of the A/D converting circuit 2 by means of the inverting circuit 3 with the threshold value signal j of the threshold value setting circuit 7 and a correlation pulse k is obtained, when an output e, which is greater than the threshold signal j, is inputted.

Complementing the above description, it can be said that when the polarity of a first correlation spike a indicated in FIG. 3 is positive, it is possible to set the threshold value signal j in the following period ($+_2'$) by detecting the maximum value ($+_2$ in a certain period, where the positive polarity correlation spike exists and to obtain the final correlation pulse k for the absolute value ($+_3$) in that period in the comparing circuit 8.

Furthermore, the final correlation pulse k is one obtained, corresponding to the correlation spike a from the correlator 1, and in order to judge what polarity of the correlation spike a this final correlation pulse k corresponds to, it is possible to carry out it easily by examining the most significant bit f in the timing where this correlation pulse k is obtained. (When it is "1", the polarity of the correlation spike is positive and when it is "0", it is negative).

According to the approach of the U.S. patent referred to above, the peak value h is latched by the clear signal g, and the threshold signal j is obtained based on the output i, as shown in the timing chart of FIG. 3. The process comprises, as shown in FIG. 4, establishing a threshold value j of the period from the clear signal $g_2$ to a subsequent clear signal $g_3$, based on the peak h obtained in the period from a clear signal $g_1$ to a subsequent signal $g_2$, comparing the threshold value j with the correlation spike a obtained in the period from the clear signal $g_2$ to the subsequent clear signal $g_3$, and generating the correlation pulse k.

Any variation in the correlation spike level represents instability of the received signal condition. Its main reason is the fading characteristic of the transfer path.

When variation in the correlation spike is large, such as in the fading condition of the transfer path, i.e., in a condition where no correlation exists between the correlation spike $a_1$ and the correlation spike $a_2$ in FIG. 4, no correlation spike $a_2$ of a level above the threshold value signal j is obtained by comparing the correlation spike $a_2$ with the threshold signal j established on the basis of the peak value h obtained in the period between the clear signal $g_1$ and the subsequent clear signal $g_2$, which often results in no correlation pulse $k_2$ being produced.

As a result, the above-indicated condition is subject to erroneous data demodulation.

OBJECT OF THE INVENTION

It is therefore an object of the invention to provide a correlation pulse generating circuit capable of reliable data demodulation by establishing an adequate threshold value signal even upon variation in the correlator output signal level caused by variation in the received signal level and thereby obtaining a correlation pulse reliably.

SUMMARY OF THE INVENTION

In the attempt to attain the object, a correlation pulse generating circuit according to the invention comprises: an A/D converting circuit for A/D-converting said correlation spike; an absolute value detecting circuit for detecting an absolute value of an output of said A/D converting circuit; a peak value detecting circuit for detecting a value corresponding to a peak of an output of said absolute value detecting circuit; a threshold value setting circuit responsive to an output of said peak value detecting circuit for generating a threshold value signal; a first delay circuit for delaying the output of said absolute value detecting circuit; and a comparing circuit for comparing an output of said delay circuit with said threshold value signal and for generating a correlation pulse in accordance with the comparison result.

According to the correlation pulse generating circuit mentioned above, the output of the absolute value detecting circuit is delayed by the first delay circuit, and the output of the delay circuit is compared with the threshold value signal, whereby the correlation pulse is generated. Therefore, detection of the correlation spike is carried out based on the amplitude information of the current correlation spike.

DESCRIPTION OF THE PREFERRED EMBODIMENTS

Figure 1:
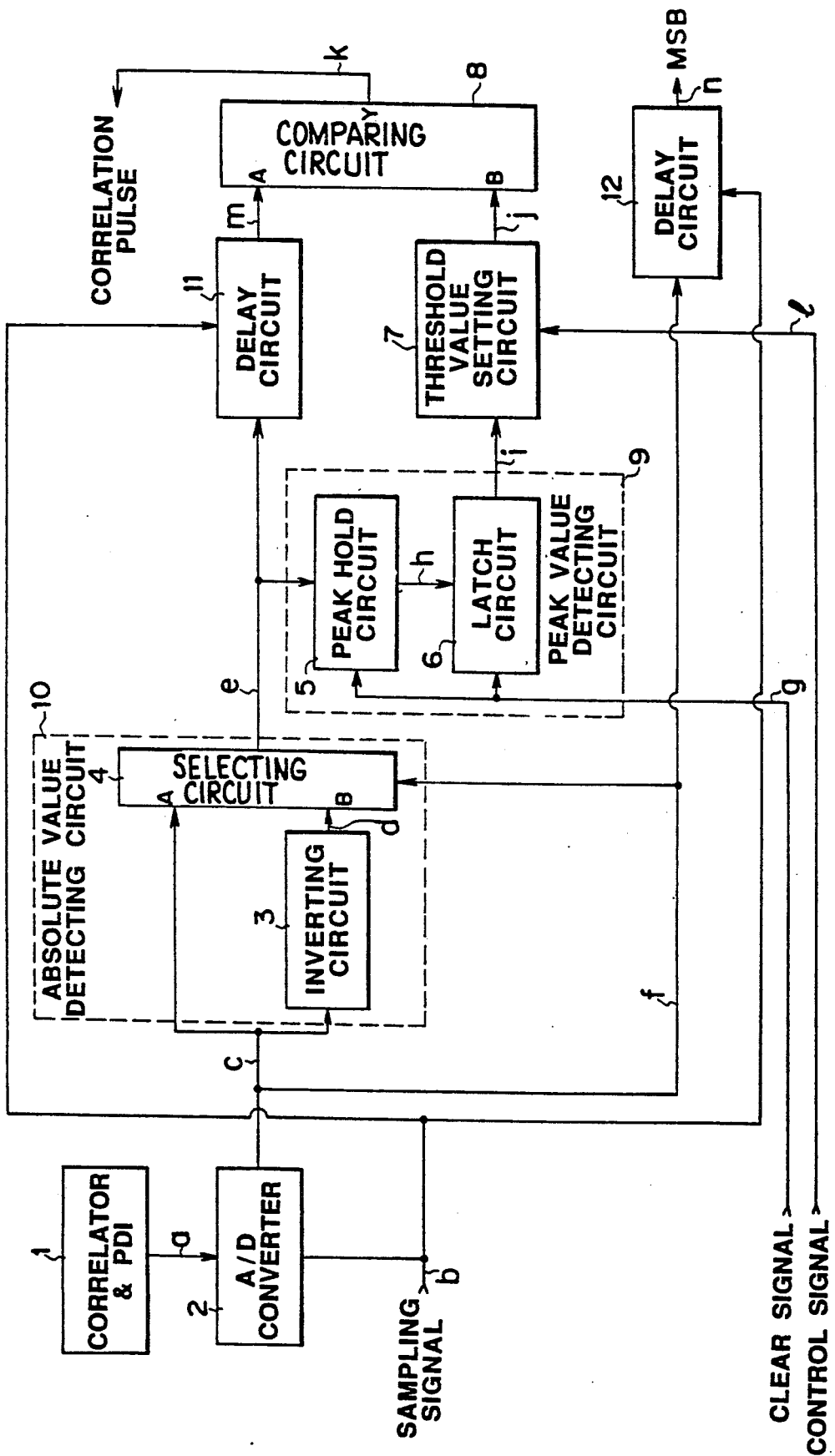
FIG. 1 is a block diagram showing an embodiment of the invention.

The invention is described below, referring to a preferred embodiment illustrated in the drawings.

Figure 2:
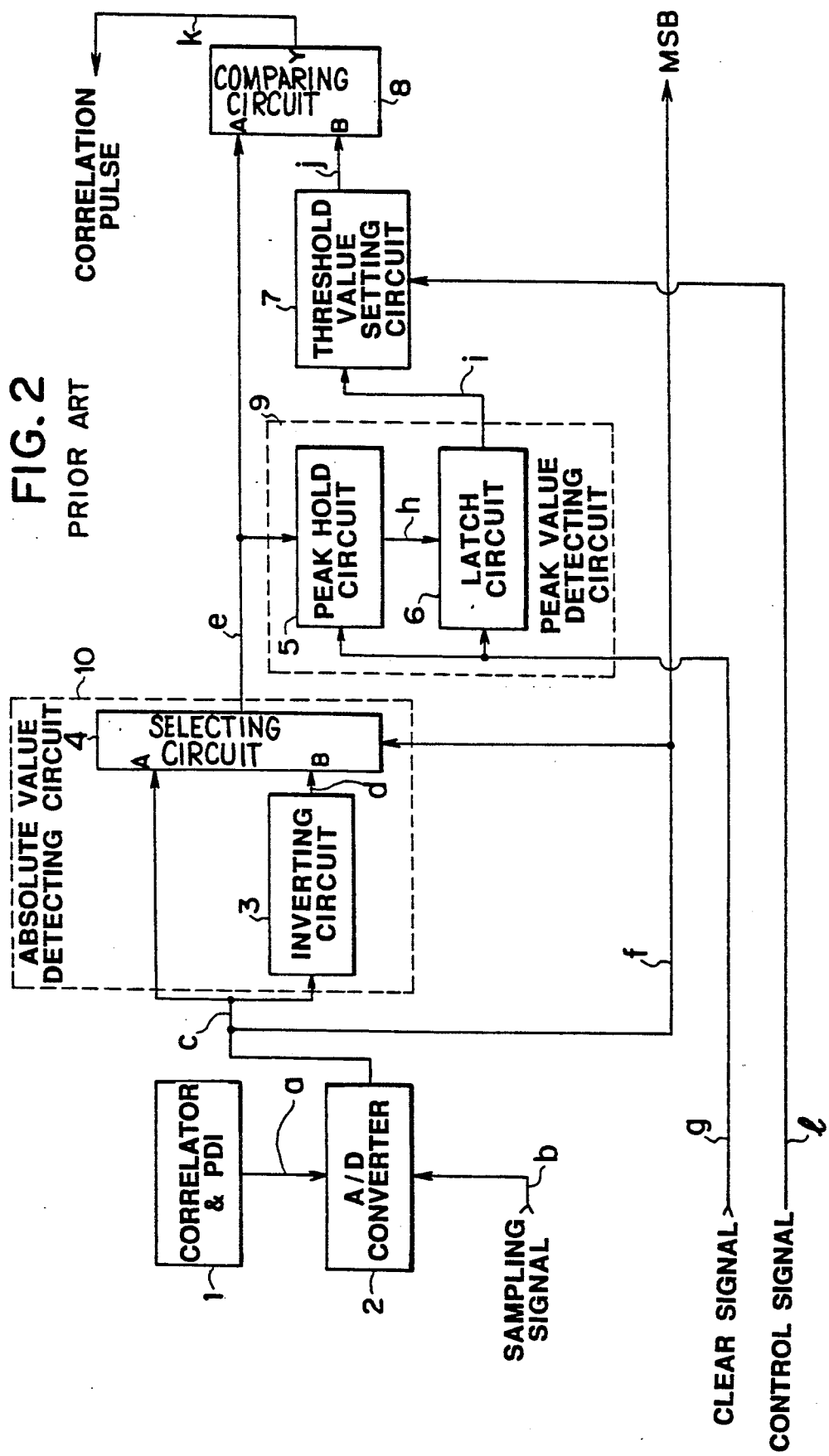
FIG. 2 is a block diagram of a correlation pulse generating circuit of a U.S. patent.
Figure 3:
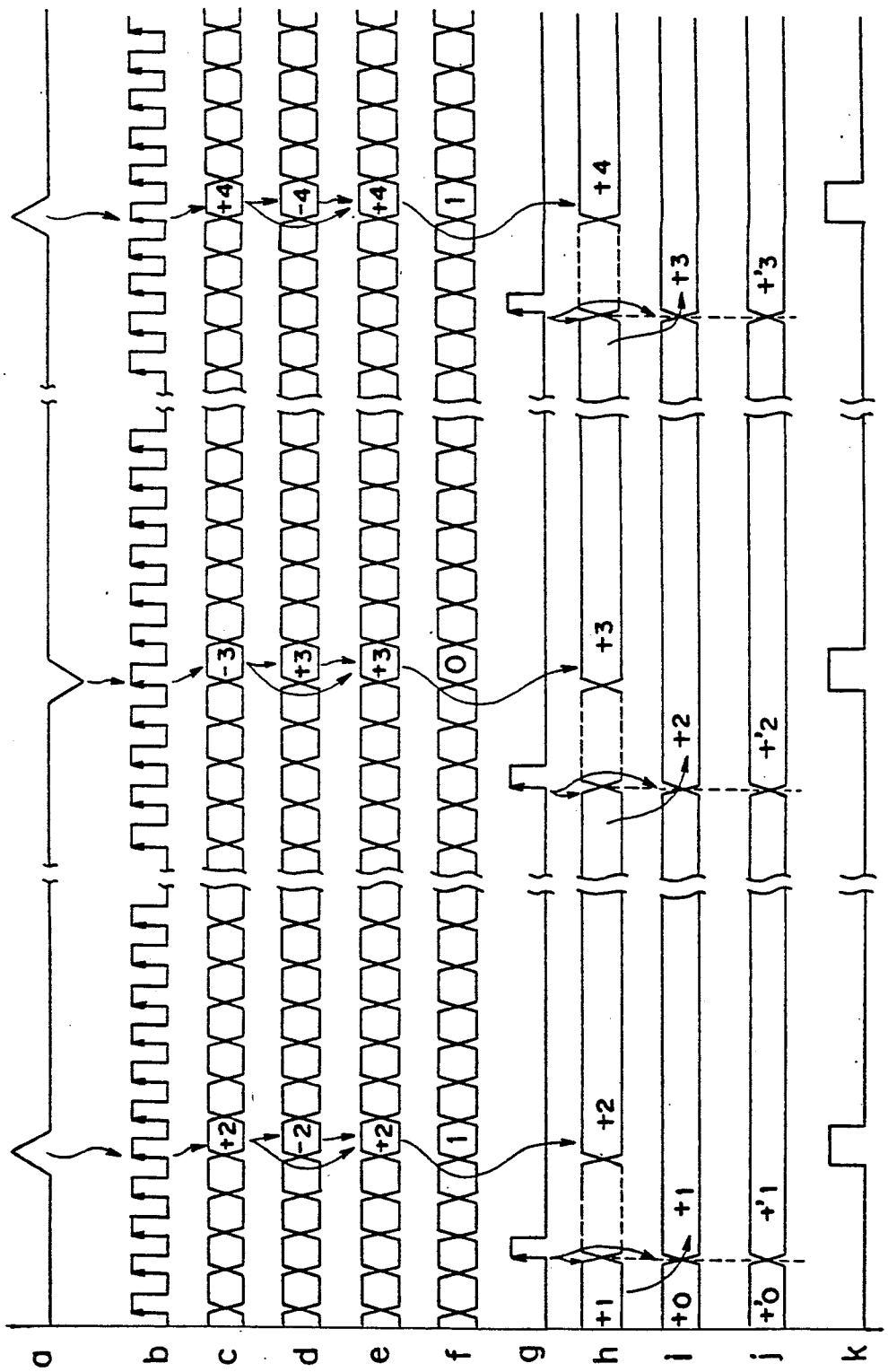
FIGS. 3 and 4 are timing charts for explanation of the operation thereof.
Figure 4:
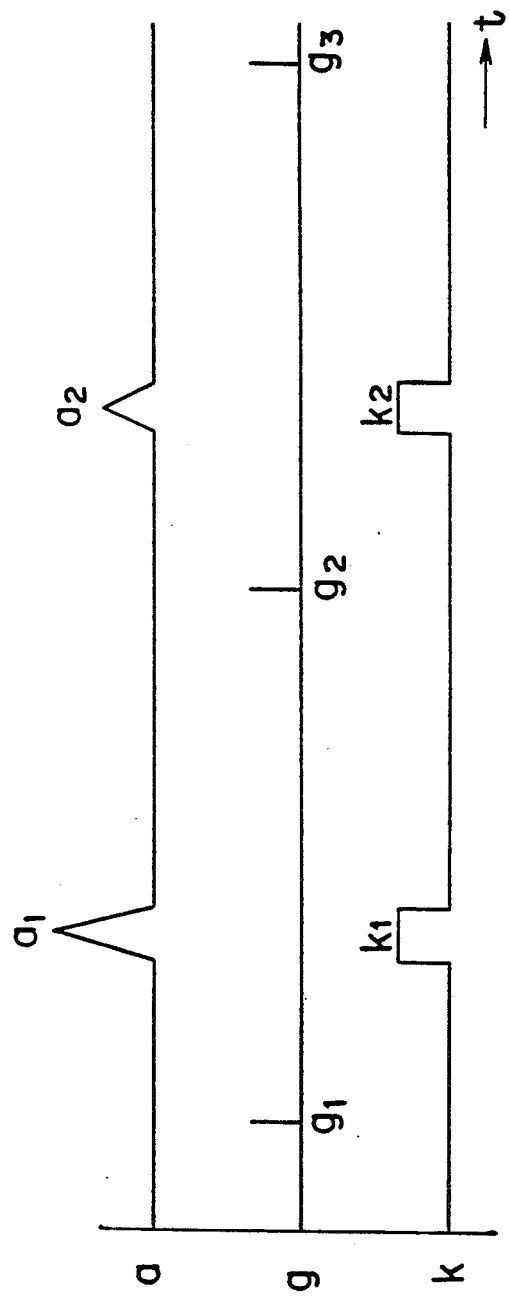

FIG. 1 shows an embodiment of correlation pulse generating circuit in a spread spectrum receiver according to the invention, with some identical or equivalent circuits to those of FIG. 2 being labelled with the same reference numerals, and with a first delay circuit 11 and a second delay circuit 12 situated as illustrated being particularly different arrangements from FIG. 2.

The first delay circuit 11 serves to delay the output e of the selecting circuit 4 of the absolute value detecting circuit 10, with a delay amount corresponding to the generating period for generating the clear signal g.

The clear signal g, which referred to in the said U.S. patent as being identical to one correlation spike period, may be regarded to be in a delay corresponding to one period of the correlation spike in the delay circuit 11. The other input of the comparing circuit 8 is supplied with an output m of the delay circuit 11. The delay circuit 11 employs the sampling signal b as its clock, and delays selected output e of the output c of the A/D converting circuit 2 obtained by the selecting circuit 4 and the inverted output d polarity-inverted by the inverting circuit 3 from the output c of the A/D converting circuit 2, by one period of the clear signal g, i.e. one correlation spike period. The delay circuit 11 may be composed of a shift register using the sampling signal b, for example, as its clock.

The comparing circuit 8 compares the output m of the delay circuit 11 with the threshold value signal j of the threshold value setting circuit 7 and, upon entry of an output m larger than the threshold value signal j, obtains the correlation pulse k.

The most significant bit f of the output c of the A/D converting circuit 2 is entered in the second delay circuit 12. The delay circuit 12 has the same delay amount as the delay circuit 11 and, as a result, can obtain a most significant bit n.

Therefore, the final correlation pulse k, which is obtained corresponding to the correlation spike a from the correlator 1, can readily determine the polarity of the correlation spike a by reviewing the most significant bit n at the timing when the correlation pulse k is obtained ("1" for a positive polarity correlation spike and "0" for a negative polarity correlation spike).

Thus the procedure according to the invention can perform real time controls because its decision is based on amplitude information of a current correlation spike whereas the conventional approach uses amplitude information on a past correlation spike for decision for detection of a current correlation spike.

As explained above, the invention allows a simple circuit arrangement: nevertheless, it reliably detects positive and negative polarity correlation spikes corresponding to binary base band information, even upon conditions where level variation occurs in the correlator output signal level, caused by variation in the received signal level, thus realizing an excellent pulse generating circuit with no failure.

What is claimed is:

1. A correlation pulse generating circuit used in a spread spectrum receiver for obtaining a correlation pulse from a correlation spike obtained by correlating a received signal with a reference signal in a correlator, comprising:
    an A/D converting circuit for A/D-converting said correlation spike;
    an absolute value detecting circuit for detecting an absolute value of an output of said A/D converting circuit;
    a peak value detecting circuit for detecting a value corresponding to a peak of an output of said absolute value detecting circuit;
    a threshold value setting circuit responsive to an output of said peak value detecting circuit for generating a threshold value signal;
    a first delay circuit for delaying the output of said absolute value detecting circuit by one period of said correlation spike; and
    a comparing circuit for comparing an output of said delay circuit with said threshold value signal and for generating a correlation pulse in accordance with the comparison result.

2. The correlation pulse generating circuit according to claim 1 further comprising a second delay circuit for delaying the output of said A/D converting circuit and for obtaining the most significant bit of the output.

3. The correlation pulse generating circuit according to claim 2 wherein said second delay circuit delays to input signal by one period of said correlation spike.

4. The correlation pulse generating circuit according to claim 2 wherein said first and second delay circuits are each composed of a shift register em as its clock a sampling signal used for sampling by said A/D converting circuit.

5. The correlation pulse generating circuit according to claim 3 wherein said first and second delay circuits are each composed of a shift register employing as its clock a sampling signal used for sampling by said A/D converting circuit.

* * * * *

UNITED STATES PATENT AND TRADEMARK OFFICE
CERTIFICATE OF CORRECTION

PATENT NO.  :   5 138 632
DATED       :   August 11, 1992
INVENTOR(S) :   Yoshitaka UCHIDA It is certified that error appears in the above-identified patent and that said Letters Patent is hereby corrected as shown below:

Column 6, line 28; replace "to" with ---its---.
         line 32; replace "em" with ---employing---.

Signed and Sealed this

Twenty-sixth Day of October, 1993

Attest:

BRUCE LEHMAN

*Attesting Officer*         *Commissioner of Patents and Trademarks*